US011188139B2

(12) United States Patent
Hashimoto

(10) Patent No.: US 11,188,139 B2
(45) Date of Patent: Nov. 30, 2021

(54) STORAGE SYSTEM, METHOD OF CONTROLLING SAME, INFORMATION PROCESSING APPARATUS, AND STORAGE MEDIUM

(71) Applicant: CANON KABUSHIKI KAISHA, Tokyo (JP)

(72) Inventor: Minoru Hashimoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 293 days.

(21) Appl. No.: 15/875,163

(22) Filed: Jan. 19, 2018

(65) Prior Publication Data

US 2018/0210539 A1 Jul. 26, 2018

(30) Foreign Application Priority Data

Jan. 25, 2017 (JP) .............................. JP2017-011391

(51) Int. Cl.
*G06F 1/3287* (2019.01)
*G06F 1/3221* (2019.01)
(Continued)

(52) U.S. Cl.
CPC .......... *G06F 1/3287* (2013.01); *G06F 1/3221* (2013.01); *G06F 1/3268* (2013.01);
(Continued)

(58) Field of Classification Search
CPC .... G06F 1/3221; G06F 1/3268; G06F 1/3275; G06F 3/0625; G06F 3/0634; G06F 3/068;
(Continued)

(56) References Cited

U.S. PATENT DOCUMENTS 5,978,923 A * 11/1999 Kou ...................... G06F 1/3203
713/323
8,643,888 B2 2/2014 Teshima
(Continued)

FOREIGN PATENT DOCUMENTS

JP  2004240504 A  8/2004
JP  2009295144 A  12/2009
(Continued)

OTHER PUBLICATIONS

Extended European Search Report issued in European Appln. No. 18150032.3 dated May 30, 2018.
(Continued)

*Primary Examiner* — Ji H Bae
(74) *Attorney, Agent, or Firm* — Rossi, Kimms & McDowell LLP

(57) ABSTRACT

A sub-CPU of a storage system discriminates in advance whether a storage device connected to a SATA bridge is an HDD (a first type) or an SSD (a second type). Upon receiving a power saving shift instruction that does not distinguish a type of the storage device from a main CPU via a SATA controller, the sub-CPU instructs a power control unit corresponding to the discriminated type to perform power control for causing the storage device to shift to a power saving state. The sub-CPU makes an instruction for power control to a GPIO if the discriminated type is HDD, and has a SATA host I/F cause the storage device shift to the power saving state if the discriminated type is SSD.

10 Claims, 9 Drawing Sheets

(51) Int. Cl.
*G06F 1/3234* (2019.01)
*G06F 3/06* (2006.01)

(52) U.S. Cl.
CPC ............ *G06F 1/3275* (2013.01); *G06F 3/068* (2013.01); *G06F 3/0625* (2013.01); *G06F 3/0634* (2013.01); *Y02D 10/00* (2018.01)

(58) Field of Classification Search
CPC ...... G06F 1/266; Y02D 10/171; Y02D 10/14; Y02D 10/154
USPC ........................................................ 713/320
See application file for complete search history.

(56) References Cited

U.S. PATENT DOCUMENTS

| | | | |
|---|---|---|---|
| 9,417,810 | B1 | 8/2016 | Dang et al. |
| 9,824,716 | B2 | 11/2017 | Igashira |
| 2009/0240881 | A1* | 9/2009 | Halloush ............... G06F 1/3203 711/114 |
| 2011/0083026 | A1 | 4/2011 | Mikami et al. |
| 2011/0099339 | A1 | 4/2011 | Hagiwara |
| 2011/0283128 | A1 | 11/2011 | Farhan et al. |
| 2012/0054430 | A1* | 3/2012 | Iwamitsu ............... G06F 1/3221 711/114 |
| 2012/0084503 | A1 | 4/2012 | Hagiwara |
| 2014/0207996 | A1* | 7/2014 | Fisher .................. G06F 3/0625 711/103 |
| 2014/0226400 | A1 | 8/2014 | Kimura |
| 2014/0281600 | A1* | 9/2014 | Wells .................... G06F 1/3206 713/320 |
| 2015/0153977 | A1* | 6/2015 | Tanaka ............... G06K 15/4055 358/1.14 |
| 2015/0177817 | A1* | 6/2015 | Badri .................... G06F 1/3268 713/320 |
| 2015/0234448 | A1 | 8/2015 | Ichida et al. |
| 2016/0156798 | A1 | 6/2016 | Wang |

FOREIGN PATENT DOCUMENTS

| | | |
|---|---|---|
| JP | 2011081550 A | 4/2011 |
| JP | 2011095916 A | 5/2011 |
| JP | 2012079100 A | 4/2012 |
| JP | 2012094063 A | 5/2012 |
| JP | 2013041430 A | 2/2013 |
| JP | 2013250616 A | 12/2013 |
| JP | 2016103704 A | 6/2016 |
| JP | 2016184371 A | 10/2016 |

OTHER PUBLICATIONS

Office Action issued in Japanese Appln. No. 2017-011391 dated Nov. 22, 2018.
Office Action issued in Japanese Appln No. 2017-011391 dated Jul. 3, 2020.

* cited by examiner

STORAGE SYSTEM, METHOD OF CONTROLLING SAME, INFORMATION PROCESSING APPARATUS, AND STORAGE MEDIUM

BACKGROUND OF THE INVENTION

Field of the Invention

The present invention relates to a storage system, a method for controlling the same, an information processing apparatus, and a storage medium, and in particular relates to power saving control of a storage device.

Description of the Related Art

In recent years, in an image forming apparatus typified by a printer, an MFP (multi-function peripheral), or the like, it is an important issue to suppress power consumption in particular at times when processing is not being performed in order to support international standards such as the international Energy Star program, Blue Angel, and the ErP Directive. As storage devices mounted to image forming apparatuses, not only HDDs (hard disk drive) but also SSDs (solid state drive) are being studied.

It is known that a greater power saving effect is achieved by an on/off operation for a power source in an HDD that employs the widespread SATA (serial ATA) as an interface for a storage device. However, there is a restriction on the number of times that an on/off operation can be performed, due to the durability of the HDD with respect to operations for turning the power source on or off. For this reason it is necessary to not frequently perform power source on/off operations for an HDD, and therefore a time-out value for causing the power source to shift to the off state when the HDD is not in use is set to a comparatively long value (for example, ten minutes).

In contrast, the SATA interface employed by an SSD supports DEVSLP (Device Sleep), and it is possible to cause the SSD to shift to a power saving state (a DEVSLP state) in accordance with a DEVSLP signal for power saving control. Power consumption by an SSD that is in the DEVSLP state is at a low level similar to the power OFF state. For this reason, there are cases in which DEVSLP is employed for power saving control in an SSD, instead of a power source on/off operation. Differing from an HDD, restrictions on a number of times that a power source on/off operation or assert/negate (switching to an ON state/switching to an OFF state) for a DEVSLP signal can be executed are typically not arranged in an SSD. For this reason, a time-out value for causing an SSD to shift to the power saving state at a time when the SSD is not in use can be set to zero or value corresponding to a short time.

In an image forming apparatus as described above, there are cases in which a configuration where a controller such as a SATA bridge is provided between (at least one) storage device and a main CPU for controlling the apparatus as a whole is employed as a storage device control configuration. In such a configuration, power saving control is realized by the controller separately controlling a power source on/off operation for each connected storage device (for example, refer to Japanese Patent Laid-Open No. 2012-94063).

In a configuration where a controller such as a SATA bridge is provided between a main CPU and a storage device, an instruction regarding power saving control of the storage device is sent from the main CPU to the controller. However, because the instruction from the main CPU normally does not distinguish the type of storage device (HDD or SSD) connected to the controller, there are cases where the power saving control performed in accordance with the instruction is ill-suited to the target storage device. In addition, when a plurality of storage devices are connected to a controller, an access request from a main CPU to a storage device normally does not distinguish the storage device that is the access destination. In such a case, there is the possibility of wasteful power consumption occurring in a storage device that is not the access destination.

SUMMARY OF THE INVENTION

The present invention was conceived in view of the above described issues. The present invention provides a technique for enabling power saving control suitable for a type of a storage device provided in a storage system to be performed.

According to one aspect of the present invention, there is provided a storage system comprising: a storage device controlled by a control circuit; a first power control unit configured to perform power control corresponding to a storage device of a first type whose lifetime is influenced by a number of shifts to a power saving state; a second power control unit configured to perform power control different to the power control by the first power control unit and corresponding to a storage device of a second type whose lifetime is less influenced by a number of shifts to the power saving state than the storage device of the first type; and a control unit configured to discriminate whether the storage device is of the first type or the second type, and controlling the storage device, wherein the control unit, upon receiving from the control circuit a shift instruction that is for causing the storage device to shift to the power saving state and that does not distinguish the type of the storage device, instructs power control unit corresponding to the discriminated type to perform power control for causing the storage device to shift to the power saving state.

According to another aspect of the present invention, there is provided a method of controlling a storage system, the storage system comprising: a storage device controlled by a control circuit; a first power control unit configured to perform power control corresponding to a storage device of a first type whose lifetime is influenced by a number of shifts to a power saving state; and a second power control unit configured to perform power control different to the power control by the first power control unit and corresponding to a storage device of a second type whose lifetime is less influenced by a number of shifts to the power saving state than the storage device of the first type, and the method comprising:
discriminating whether the storage device is of the first type or the second type; and upon receiving from the control circuit a shift instruction that is for causing the storage device to shift to the power saving state and that does not distinguish the type of the storage device is received, instructing power control unit corresponding to the discriminated type to perform power control for causing the storage device to shift to the power saving state.

According to still another aspect of the present invention, there is provided a computer-readable storage medium storing a program for causing a computer to execute each step of a method of controlling a storage system, the storage system comprising: a storage device controlled by a control circuit; a first power control unit configured to perform power control corresponding to a storage device of a first type whose lifetime is influenced by a number of shifts to a power saving state; and a second power control unit configured to perform power control different to the power control by the first power control unit and corresponding to a storage device of a second type whose lifetime is less influenced by a number of shifts to the power saving state than the storage device of the first type, and the method comprising: discriminating whether the storage device is of the first type or the second type; and upon receiving from the control circuit a shift instruction that is for causing the storage device to shift to the power saving state and that does not distinguish the type of the storage device is received, instructing power control unit corresponding to the discriminated type to perform power control for causing the storage device to shift to the power saving state.

According to yet another aspect of the present invention, there is provided an information processing apparatus capable of connecting to a magnetic storage device and a semiconductor storage device, the apparatus comprising: a hardware processor; and a memory controller which executes operations to cause, in accordance with a predetermined signal inputted from the hardware processor, respectively different power control with respect to the magnetic storage device and the semiconductor storage device.

By virtue of the present invention, it is possible to perform power saving control suited to the type of a storage device provided in a storage system. Accordingly, it is possible to increase a power saving effect in accordance with power saving control of the storage device.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

In the first embodiment, explanation is given regarding a multi-function peripheral (MFP) that is an image forming apparatus (an image processing apparatus) having a large number of functions such as a printing (print) function, a copying (copy) function, a reading (scan) function, an image transmission function, and an image saving function, as an example of an information processing apparatus. Note that the present embodiment can be applied to not only an MFP but also information processing apparatuses such as a printing apparatus (a printer), a copying machine, a facsimile apparatus, and a PC.

<MFP>

Figure 1:
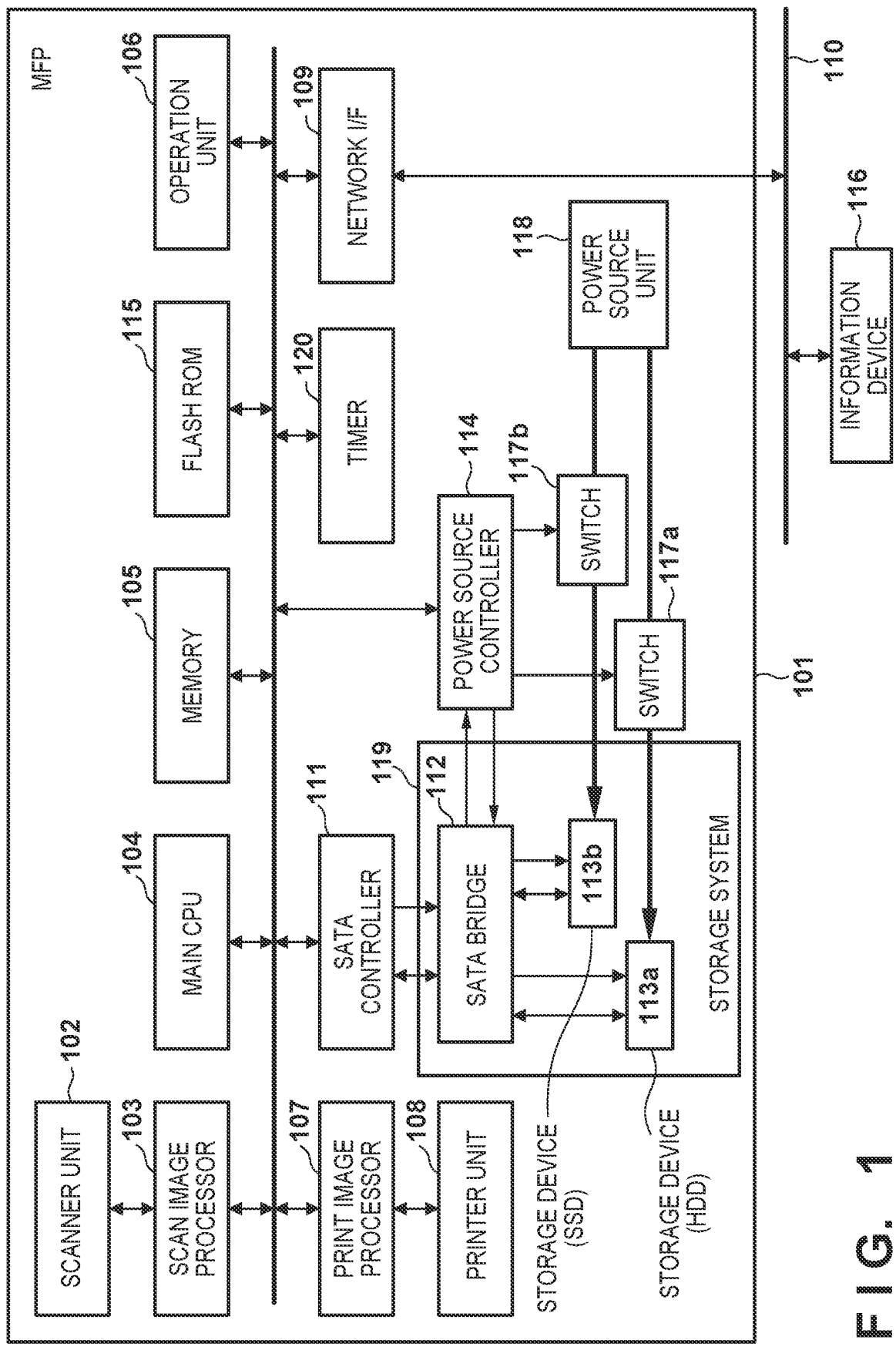
FIG. 1 is a block diagram illustrating an example configuration of an MFP.

FIG. 1 is a block diagram illustrating an example configuration of an MFP 101 according to the present embodiment. The MFP 101 is provided with a scan image processor 103, a main CPU 104, a memory 105, a flash ROM (a flash memory) 115, an operation unit 106, a print image processor 107, a SATA (Serial ATA) controller 111, a power source controller 114, a timer 120, and a network interface (the I/F) 109 as devices connected to a system bus. The MFP 101 is further provided with a scanner unit 102, a printer unit 108, switches (power source switches) 117a and 117b, a storage system 119 (a power source control system), and a power source unit 118. The scanner unit 102, the printer unit 108, and the storage system 119 are respectively connected to the scan image processor 103, the print image processor 107, and the SATA controller 111.

The MFP 101 has a print function for printing an image on a sheet in accordance with the printer unit 108, based on image data generated by the scanner unit 102, or image data received from an external apparatus via the network I/F 109. In addition, the MFP 101 has a scan function for transmitting image data generated by the scanner unit 102 to an external apparatus via the network I/F 109, or saving the generated image data to a storage device (the storage devices 113a and 113b).

The scanner unit 102 optically reads an image of a sheet original to generate image data corresponding to the image, and then transmits the image data to the scan image processor 103. The scan image processor 103 performs image processing on image data received from the scanner unit 102, and subsequently transmits the image data to the network I/F 109 or the SATA controller 111. The print image processor 107 performs image processing on image data received from the scan image processor 103 or the network I/F 109, and subsequently transmits the image data to the printer unit 108. The printer unit 108 prints an image on a sheet based on image data received from the print image processor 107.

The main CPU 104 controls the MFP 101 as a whole. The memory 105 is a DRAM (Dynamic Random Access Memory), stores a control program executed by the main CPU 104, and is used as a work area for temporarily storing data. The flash ROM 115 stores a program executed by the main CPU 104, and setting information that is used by the main CPU 104. The operation unit 106 notifies information of the MFP 101 to a user, and accepts an operation from a user. The timer 120 is used by the main CPU 104 for timekeeping (measurement of a certain amount of time).

The network interface (I/F) 109 is a communication interface for performing communication with an external apparatus such as an information device 116, via a LAN 110. The MFP 101 is connected to the LAN (local area network) 110, and is capable of communication with an external apparatus such as the information device 116, via the LAN 110. The LAN 110 may be a wired LAN and may be a wireless LAN. Via the LAN 110, the information device 116, which is a PC for example, can receive a scan image from the MFP 101 and can transmit a print job to the MFP 101.

The SATA controller 111 controls a peripheral device that conforms to a SATA (Serial ATA) standard, and performs transmission/reception of data with respect to such a peripheral device. The storage system 119 is provided with a SATA bridge 112 and the storage devices 113a and 113b. The storage system 119 is recognized as one storage device by the main CPU 104. The main CPU 104 accesses the storage devices 113a and 113b via the SATA controller 111 and the SATA bridge 112. The main CPU 104 controls the storage system 119 by transmitting to the storage system 119 an instruction regarding power saving control of a storage device that the storage system 119 is provided with, and an access request with respect to the storage device. In the present embodiment, the main CPU 104 is an example of a hardware processor or a control circuit for controlling a storage device (the storage devices 113a and 113b). The SATA bridge 112 is an example of a memory controller for causing respectively different power control for a magnetic storage device (the storage device 113a in in the present embodiment) and a semiconductor storage device (the storage device 113b in the present embodiment), in accordance with a predetermined signal inputted from a hardware processor.

Note that, in the present embodiment, illustration is given of an example in which two storage devices are provided in the storage system 119, but the number of storage devices may be one, and may be three or more. In the present embodiment, illustration is given of an example in which the storage device 113a is an HDD (hard disk drive), and the storage device 113b is an SSD (a solid state drive).

The SATA bridge 112 relays communication between the SATA controller 111 and each of the storage devices 113a and 113b, and also supports power control of the storage devices 113a and 113b. In accordance with instructions from the SATA controller 111 and the SATA bridge 112, the storage devices 113a and 113b write data to an internal storage medium, and read data from the internal storage medium.

The power source controller 114 controls supply of power from the power source unit 118 to each device in the MFP 101. The present embodiment especially targets control of the supply of power from the power source unit 118 to the storage devices 113a and 113b. The power source unit 118 converts alternating current power inputted from a commercial power source to direct current power, and supplies each device in the MFP 101 with direct current power.

The switches 117a and 117b are each configured by a FET, a relay, or the like, and are switches for controlling a state of the supply of power to the storage devices 113a and 113b. Switching between a conductive state (an ON state) and a non-conductive state (an OFF state) for the switches 117a and 117b is controlled in accordance with an instruction from the power source controller 114. When the switch 117a (the switch 117b) is in the ON state, power is supplied from the power source unit 118 to the storage device 113a (the storage device 113b). In contrast, when the switch 117a (the switch 117b) is in the OFF state, supply of power from the power source unit 118 to the storage device 113a (the storage device 113b) is stopped (supply of power is not performed).

<Configuration of Storage System 119>

Figure 2:
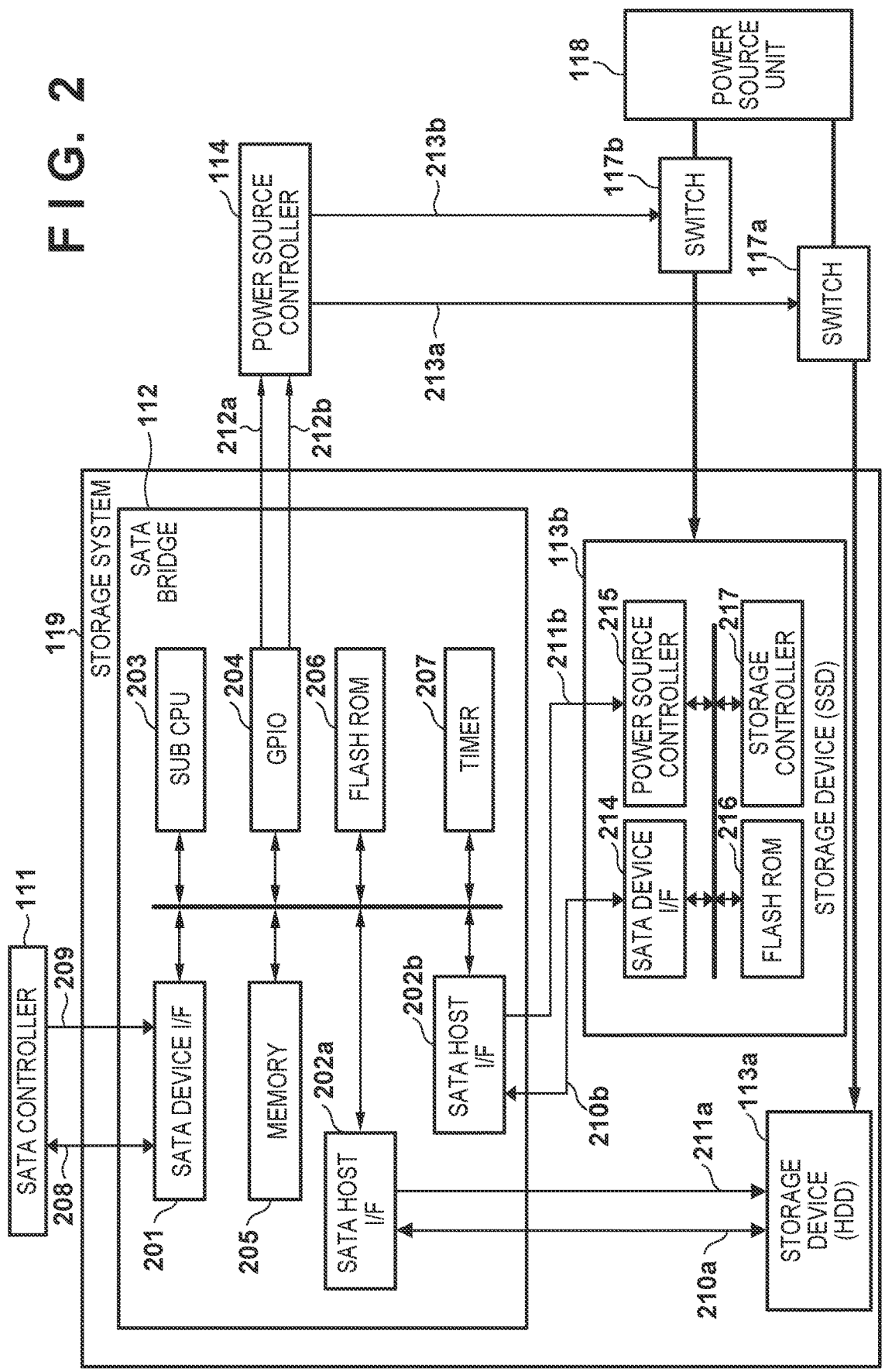
FIG. 2 is a block diagram illustrating an example configuration of a storage system.

FIG. 2 is a block diagram that illustrates an example configuration of the storage system 119. The storage system 119 is provided with a SATA device I/F 201, SATA host I/Fs 202a and 202b, a sub-CPU 203, a GPIO (General Purpose Input/Output) 204, a memory 205, a flash ROM 206, and a timer 207.

The SATA device I/F 201 acts as a peripheral device that conforms to a SATA standard, and performs communication (transmits/receives data) with the SATA controller 111 via a SATA bus 208. In addition, the SATA device I/F 201, via a dedicated signal line, receives from the SATA controller 111 input of a DEVSLP (Device Sleep) signal 209 that has been extended for SSD and conforms to a SATA standard.

By controlling a signal level of the DEVSLP signal 209 outputted from the SATA controller 111, the main CPU 104 can transmit to the storage system 119 a shift instruction for causing a storage device to shift to a power saving mode (a power saving state). In addition, by controlling the signal level of the DEVSLP signal 209, the main CPU 104 can transmit to the storage system 119 a return instruction for causing the storage device to return from the power saving state. Note that, as described later, for a shift instruction and a return instruction transmitted by the main CPU 104, the type of the storage device (HDD or SSD) is not distinguished. In the present embodiment, illustration is given of an example in which a DEVSLP signal conforming to a SATA standard is used for power saving control of the storage system 119, but a different signal line or bus may be used.

The SATA host I/Fs 202a and 202b respectively control the storage devices 113a and 113b. The SATA host I/Fs 202a and 202b respectively perform communication (transmit/receive data) with the storage devices 113a and 113b via SATA buses 210a and 210b. In addition, the SATA host I/Fs 202a and 202b respectively output DEVSLP signals 211a and 211b, which are controlled by the sub-CPU 203, to the storage devices 113a and 113b via dedicated signal lines. The sub-CPU 203 can instruct the storage devices 113a and 113b to shift to the power saving mode (power saving state) or return from the power saving mode, by controlling signal levels of the DEVSLP signals 211a and 211b.

In the present embodiment, the storage device 113a is an HDD and is incompatible with DEVSLP. Accordingly, the DEVSLP signal 211a is not used in the storage device 113a. Meanwhile, the storage device 113b is an SSD that supports DEVSLP. Accordingly, the DEVSLP signal 211b is inputted to a power source controller 215 that is arranged inside the storage device 113b. In addition to the power source controller 215, the storage device 113b is provided with a SATA device I/F 214, a flash ROM 216, and a storage controller 217. The SATA device I/F 214 is connected to the SATA bus 210b. The flash ROM 216 is a storage element (a storage medium). The storage controller 217 controls the storage device 113b.

The power source controller 215 performs power saving control of the storage device 113b in accordance with the DEVSLP signal 211b. Upon detecting that the DEVSLP signal 211b has been asserted (switched from the OFF state to the ON state), the power source controller 215 performs controls so that power is not supplied to portions other than the power source controller 215 (other than some devices in the storage device). In other words, the power source controller 215 causes the storage device 113b to shift to the power saving state by performing control so that power is supplied to only the power source controller 215. This power saving state is referred to as a "DEVSLP state". In contrast, upon detecting that the DEVSLP signal 211b has been negated (switched from the ON state to the OFF state), the power source controller 215 performs controls for starting the supply of power to portions other than the power source controller 215 to thereby cause the storage device 113b to return to the normal power state which is a non-power saving mode.

The sub-CPU 203 controls the SATA bridge 112 as a whole. The memory 205 stores a control program that is executed by the sub-CPU 203, and is used as a work area in which data is temporarily stored. The flash ROM 206 stores a program executed by the sub-CPU 203, and setting information that is used by the sub-CPU 203.

In accordance with an instruction from the sub-CPU 203, the GPIO 204 can send an instruction to the power source controller 114 by using two GPIO signals 212a and 212b. In accordance with the signal level of the GPIO signal 212a outputted from the GPIO 204, the power source controller 114 causes the signal level of a switch control signal 213a outputted to the switch 117a to change to thereby control ON/OFF of the switch 117a. In accordance with the signal level of the GPIO signal 212b outputted from the GPIO 204, the power source controller 114 causes the signal level of a switch control signal 213b outputted to the switch 117b to change to thereby control ON/OFF of the switch 117b. In this way ON/OFF control of the supply of power from the power source unit 118 to the storage devices 113a and 113b is performed.

In the present embodiment, the GPIO 204 is an example of a first power control unit for performing power control that corresponds to a storage device (an HDD) of a first type as described below. Note that the power source controller 114 and the switches 117a and 117b may be included in the first power control unit. The SATA host I/Fs 202a and 202b are an example of a second power control unit for performing power control different to that of the first power control unit, being power control that corresponds to a storage device (an SSD) of a second type as described below. In addition, the sub-CPU 203 is an example of a control unit for discriminating (step S502 and step S503 of FIG. 5 which are described below) whether the storage devices 113a and 113b connected to the SATA bridge 112 are of the first type (HDD) or the second type (SSD), and for controlling the storage devices.

<Comparative Example>

Figure 3:
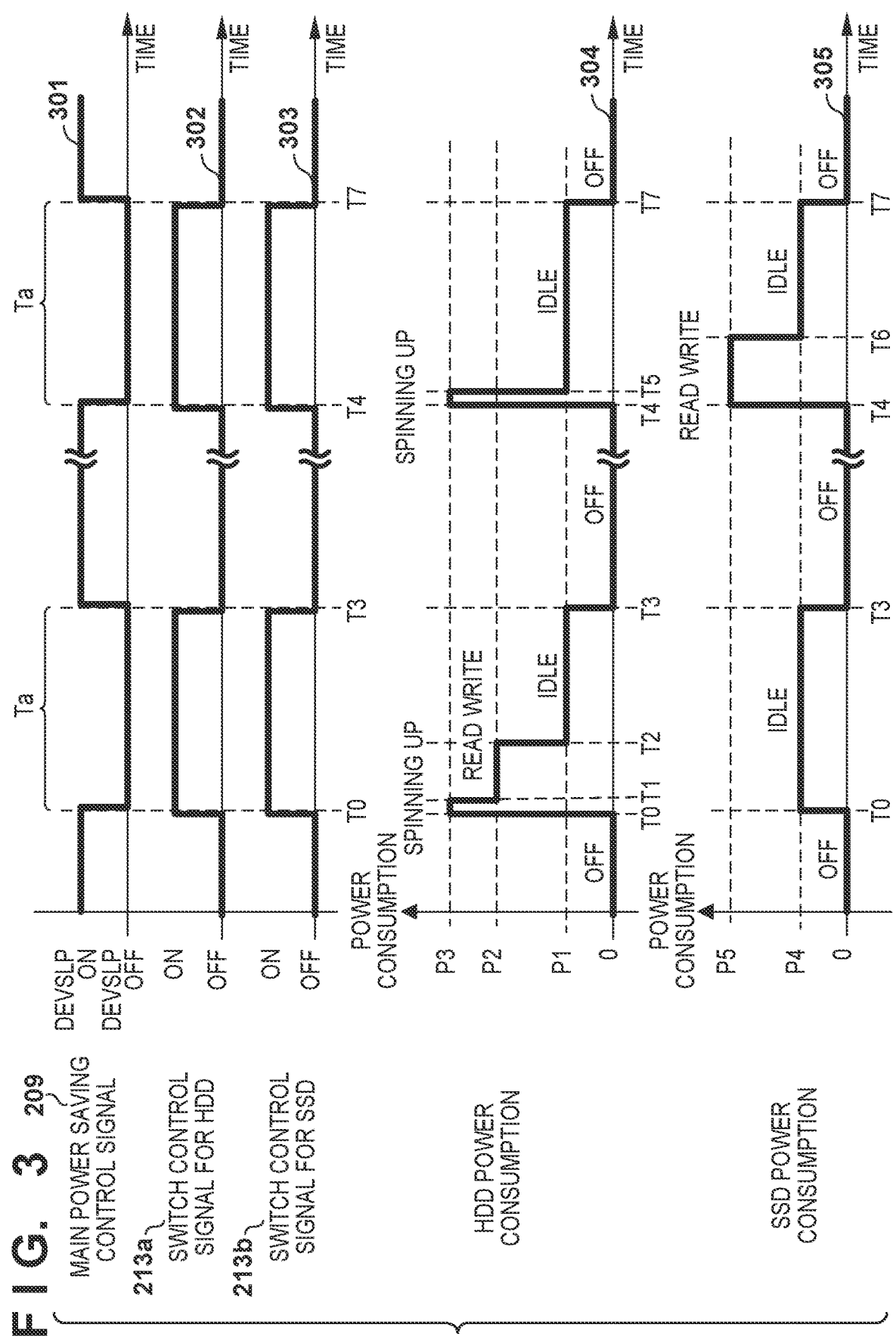
FIG. 3 illustrates an example transition of power consumption of a storage device and control signals in power saving control of a comparative example.

FIG. 3 illustrates an example transition of power consumption of the storage devices 113a and 113b and control signals for power saving control, and illustrates waveforms achieved in accordance with power saving control of a comparative example. Here, firstly description is given regarding a comparative example in order to clarify an effect of reducing power consumption in the present embodiment. In the present comparative example, the sub-CPU 203 performs ON/OFF control of the supply of power to the storage devices 113a and 113b in accordance with the DEVSLP signal 209 under control by the main CPU 104, regardless of whether the storage devices 113a and 113b are an HDD or an SSD.

FIG. 3 illustrates each of waveforms 301 through 303 for the DEVSLP signal 209 (a main power saving control signal) under control by the main CPU 104, the switch control signal 213a for an HDD, and the switch control signal 213b for an SSD, as control signals for power saving control. The switch control signals 213a and 213b are control signals for ON/OFF control of the switches 117a and 117b, respectively. FIG. 3 also illustrates a waveform 304 that represents temporal change of power consumption by the storage device 113a (an HDD), and a waveform 305 that represents temporal change of the power consumption by the storage device 113b (an SSD).

The DEVSLP signal 209, which is a power saving control signal outputted from the SATA controller 111, is controlled by the main CPU 104. The DEVSLP signal 209 changes between an ON state that corresponds to a high (H) level, and an OFF state that corresponds to a low (L) level, as with the waveform 301. The ON state of the DEVSLP signal 209 corresponds to a power saving state (a power saving mode), and the OFF state corresponds to a normal power state (a standby mode).

FIG. 3 illustrates an example in which the main CPU 104 controls the DEVSLP signal 209 as follows. Specifically, the main CPU 104 negates the DEVSLP signal 209 (switches it from the ON state to the OFF state) as in the waveform 301 at times T0 when access to the HDD occurs, and T4 when access to the SSD occurs. By this, the main CPU 104 instructs the storage system 119 to return from the power saving state. Note that, as described above, the main CPU 104 recognizes the storage devices 113a and 113b as one storage device. For this reason, the main CPU 104 causes the SATA controller 111 to negate the DEVSLP signal 209 when access to the storage device occurs.

Furthermore, the main CPU 104 asserts the DEVSLP signal 209 (switches it from the OFF state to the ON state) if access to the storage device has not occurred before a predetermined amount of time Ta (10 minutes in the present example) from when the DEVSLP signal 209 was negated elapses. In other words, the main CPU 104 causes the SATA controller 111 to assert the DEVSLP signal 209, as with the waveform 301, at times T3 which is after the amount of time Ta elapses from T0, and T7 which is after the amount of time Ta elapses from T4. In this way, in a duration until the DEVSLP signal 209 is asserted (while it is kept in the OFF state), the storage devices 113a and 113b are inhibited from shifting to the power saving state.

Here, inhibiting the storage device from shifting to the power saving state for the predetermined amount of time Ta is because there is a limit on the number of times that an ON/OFF operation can be executed for an HDD that can be used as the storage device. An HDD spins up when shifting from the power saving state (or the power OFF state) to the normal power state, and spins down when shifting from the normal power state to the power saving state (or the power OFF state). Spinning up and spinning down (on/off operation) of an HDD typically influences the lifetime of an HDD (in other words, a time period until the HDD malfunctions). When an HDD is frequently caused to shift to the power saving state, the time period until the HDD malfunctions will shorten due to execution of an on/off operation. Thus, an HDD is a storage device of a type (a first type) for which a number of shifts to a power saving state influences the lifetime of the storage device.

For this reason, if it is assumed that a service life for the NFP 101 is five years and the HDD meets the end of its lifetime due to execution of approximately 300,000 on/off operations, for example, it is considered that the HDD should not be caused to shift to the power saving state at a shorter frequency than once every 10 minutes. In such a case, the predetermined amount of time Ta (the amount of time until a shift to the power saving state starts) described above is set to 10 minutes, for example. Note that the amount of time Ta may be set to an amount of time other than 10 minutes, based on an HDD specification or a use case of the NFP 101. The HDD (hard disk drive) is an example of a non-volatile storage device having a magnetic head (a magnetic storage device), and thus such an influence on its lifetime appears. In the HDD, friction occurs by a platter and a head contacting when the power source is turned on or off. In addition, there are cases where thermal expansion occurs when the power source is turned on or off. For these reasons, it can be said that the lifetime shortens in accordance with a number of times the power source is turned on or off. In contrast to this, in an SSD (solid state drive) which is an example of a non-volatile storage device that uses and is mounted with a semiconductor flash memory (a semiconductor storage device), an influence on lifetime as described above is assumed to be small.

The main CPU 104 can use the timer 120 to measure the amount of time Ta. In this way, the timer 120 is used to protect the HDD. In the present comparative example, the main CPU 104 uniformly performs power saving control based on the timer 120 by considering HDD protection even if an SSD may be mounted, and is not aware whether a storage device mounted in the storage system 119 is an HDD or an SSD.

Note that, for an SSD (the storage device 113b), an operation to shift from the power saving state (or the power OFF state) to the normal power state and an operation to shift from the normal power state to the power saving state (or the power OFF state) (on/off operations) do not influence the lifetime of the SSD. Alternatively, at least, an influence on the lifetime due to a shift operation in an SSD is less than the influence on the lifetime due to a shift operation in an HDD. For this reason, even if an SSD is frequently caused to shift to the power saving state, a time period until the SSD malfunctions does not get shorter than the case of an HDD due to execution of OFF/ON operations. Thus, an SSD is a storage device of a type (a second type) where a number of shifts to the power saving state does not influence the lifetime of the storage device (or an influence on the lifetime due to a number of shifts to the power saving state is smaller than for an HDD).

Next, explanation is given regarding power saving control of the storage devices 113a and 113b by the sub-CPU 203 in the present comparative example, as a premise for control of the DEVSLP signal 209 as described above. In the present comparative example, the sub-CPU 203 causes the signal level of both of the switch control signals 213a and 213b to change upon detecting change of the signal level of the DEVSLP signal 209, as with the waveforms 302 and 303 of FIG. 3.

The switch control signals 213a and 213b change between an ON state corresponding to the H-level, and an OFF state corresponding to the L-level. The ON state of the switch control signals 213a and 213b corresponds to the ON state of the switches 117a and 117b, and indicates that power is supplied to the corresponding storage devices 113a and 113b. The OFF state of the switch control signals 213a and 213b corresponds to the OFF state of the switches 117a and 117b, and indicates that power is not supplied to the corresponding storage devices 113a and 113b. In this way, in the present comparative example, as power saving control of the storage devices 113a and 113b, the sub-CPU 203 performs control to cause the storage devices 113a and 113b to uniformly shift to the power OFF state, in accordance with the DEVSLP signal 209.

(HDD Power Consumption)

In accordance with the power saving control by the sub-CPU 203, power consumption by the storage device 113a (HDD) changes as with the waveform 304 of FIG. 3. Note that FIG. 3 illustrates an example where the DEVSLP signal 209 is negated at T0 due to the occurrence of access to the storage device 113a (HDD), and the DEVSLP signal 209 is negated at T4 due to the occurrence of access to the storage device 113b (SSD).

Before T0 the switch 117a is in the OFF state, and power consumption for the storage device 113a (the HDD) is zero. At T0, when access to the HDD occurs and the DEVSLP signal 209 is negated, the switch 117a enters the ON state in accordance with the switch control signal 213a, and supply of power to the HDD is started. By this, the HDD spins up in a time period from T0 to T1. The power consumption of the HDD at this time is P3. The HDD consumes the most power in spinning up, and P3 is 5 W, for example. Note that the time period from T0 to T1 is approximately two seconds.

Subsequently in a time period from T1 to T2, read/write access to the HDD by the main CPU 104 is performed. Power consumption of the HDD at this time is P2 (approximately 2 W) which is lower than P3. In the time period from T2 to T3, the HDD is in an idle state where access does not occur. Power consumption of the HDD at this time decreases from P2 to P1 (approximately 500 mW). T3 is at a point in time where the amount of time Ta (ten minutes) has elapsed since the DEVSLP signal 209 was negated. In the time period from T2 to T3, the HDD is kept in the idle state to protect the HDD as described above. At T3, when the DEVSLP signal 209 is asserted, the switch 117a enters the OFF state in accordance with the switch control signal 213a, and supply of power to the HDD is stopped. By this, the power consumption of the HDD becomes 0.

Subsequently, at T4, when access to the SSD occurs and the DEVSLP signal 209 is negated again, the switch 117a enters the ON state, and the HDD spins up in a time period from T4 to T5. However, because the DEVSLP signal 209 is negated due to access to the SSD occurring at T4, in the time period from T5 to T7, the HDD is in the idle state (power consumption P1), with no access to the HDD performed by the main CPU 104. Power consumption by the HDD in this time period is wasteful, and it is desirable to reduce this power.

(SSD Power Consumption)

In accordance with the power saving control by the sub-CPU 203, power consumption by the storage device 113b (SSD) changes as with the waveform 305 of FIG. 3. Before T0, power consumption of the storage device 113b (SSD) is zero, similarly to the HDD. At T0, when access to the HDD occurs and the DEVSLP signal 209 is negated, the switch 117b enters the ON state in accordance with the switch control signal 213b, and supply of power to the SSD is started. However, an SSD does not need an operation such as spinning up for an HDD, and becomes operable in a short amount of time of approximately 10 ms. At this time, power consumption of the SSD does not change to high power consumption (P3) as when the HDD spins up.

In the time period from T0 to T3, access to the HDD is performed by the main CPU 104, and access to the SSD does not occur. For this reason, the SSD is in an idle state, and power consumption thereof is P4. Power consumption by the SSD in the time period from T0 to T3 is wasteful, and it is desirable to reduce this power.

Subsequently, at T4, when access to the SSD occurs and the DEVSLP signal 209 is negated again, the switch 117b enters the ON state. By this, supply of power to the SSD is started, and the SSD enters an operable state. Subsequently in a time period from T4 to T6, read/write access to the SSD by the main CPU 104 is performed. The power consumption of the SSD at this point becomes P5 which is higher than the power consumption P4 in the idle state. Typically, power consumption by the SSD becomes high, for example 5 W, while read/write access is being performed.

In a time period from T6 to T7 after access to the SSD ends, the SSD is kept in the idle state similarly to the HDD, and the power consumption at this time is P4. Here, the DEVSLP signal 209 is not asserted for HDD protection until the amount of time Ta has elapsed after being negated at T4. The sub-CPU 203 performs power saving control of the storage device 113b (an SSD) similarly to the power saving control of the HDD, in accordance with this DEVSLP signal 209. However, because on/off operation with an SSD does not influence the lifetime thereof, as described above, there is no need to keep the SSD in the idle state until the predetermined amount of time Ta elapses. Accordingly, in the time period from T6 when access to the SSD ends until T7 when the DEVSLP signal 209 is asserted, power consumption by the SSD in the idle state is wasteful, and it is also desirable to reduce this power.

In this way, in the comparative example, wasteful power consumption occurs by power saving control being uniformly performed with respect to the storage devices 113a and 113b without consideration to a storage device that is an access destination, and the type of the storage device. For these reasons, in the present embodiment, (1) power consumption by the SSD that occurs by applying power saving control based on the amount of time Ta to the SSD, and
(2) power consumption that occurs due to supply of power to a storage device that is not an access destination are reduced by the sub-CPU 203 performing control different to that of the comparative example.

Specifically, the sub-CPU 203, even upon receiving an instruction that does not distinguish a type of storage device from the main CPU 104, performs an instruction for power saving control to a power control unit in accordance with a type (HDD or SSD) discriminated in advance for the target storage device. For example, when an instruction for shifting to the power saving state is received, in order to perform power control for causing a storage device to shift to the power saving state, an instruction is made to a power control unit (the GPIO 204 or the SATA host I/Fs 202a and 202b) corresponding to the type discriminated in advance for the target storage device. By this, it is possible to perform power saving control suitable for a type of a storage device provided in the storage system 119. In addition, the sub-CPU 203 determines the target storage device that is the access destination for the access request, and performs power saving control based on the determination result to thereby prevent wasteful power consumption occurring in a storage device that is not the access destination.

<Storage System Power Saving Control and Power Consumption>

Figure 4:
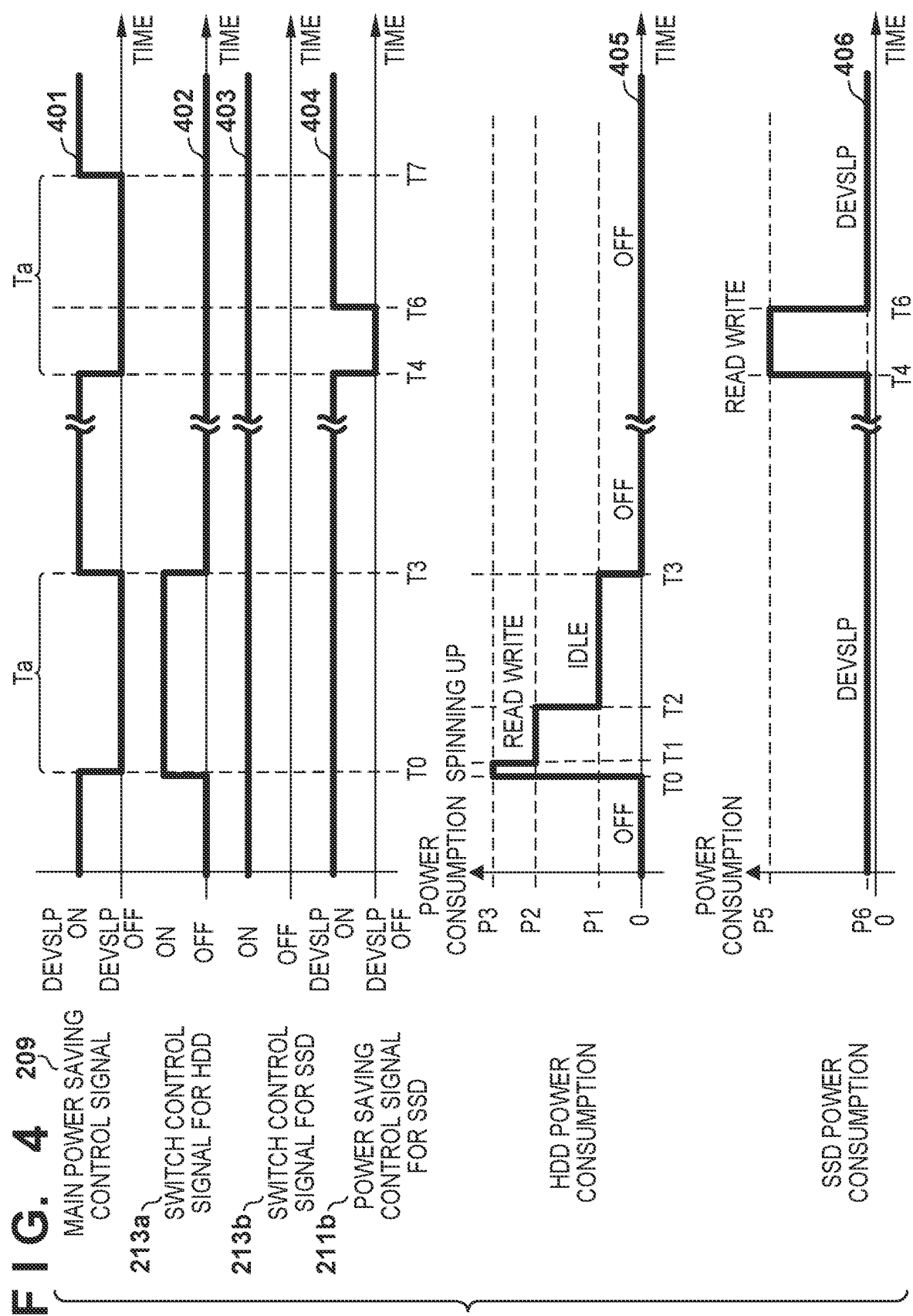
FIG. 4 illustrates an example transition of power consumption of a storage device and control signals in power saving control according to a first embodiment.

FIG. 4 illustrates an example transition of power consumption of the storage devices 113a and 113b, and control signals for the power saving control in the MFF 101 according to the present embodiment. Similarly to FIG. 3, FIG. 4 illustrates each of waveforms 401 through 403 for the DEVSLP signal 209 (a main power saving control signal) under control by the main CPU 104, the switch control signal 213a for an HDD, and the switch control signal 213b for an SSD, as control signals for power saving control. In addition to these, FIG. 4 illustrates a waveform 404 of the DEVSLP signal 211b which corresponds to the storage device 113b which is an SSD. Note that the DEVSLP signals 211a and 211b are signals that are controlled by the sub-CPU 203. Similarly with FIG. 3, FIG. 4 also illustrates a waveform 405 that represents temporal change of power consumption by the storage device 113a (an HDD), and a waveform 406 that represents temporal change of the power consumption by the storage device 113b (an SSD).

Control by the main CPU 104 in the present embodiment is similar to control by the main CPU 104 in the comparative example described above. For this reason, the waveform 401 of the DEVSLP signal 209 is similar to the waveform 301 of FIG. 3. Similarly to FIG. 3, FIG. 4 illustrates an example in which access to a storage device (the storage system 119) occurs at T0 and T4, where the access destination at T0 is the HDD (the storage device 113a) and the access destination at T4 is the SSD (the storage device 113b). The main CPU 104, which recognizes the storage devices 113a and 113b as one storage device, negates the DEVSLP signal 209 at T0 and T4 when access to the storage device occurs, as in the waveform 401, independent of the actual types of the storage devices 113a and 113b.

In the present embodiment, the sub-CPU 203 recognizes in advance the types (HDD or SSD) of the storage devices 113a and 113b by executing processing for discriminating each type of the storage devices 113a and 113b when the NFP 101 is initialized, for example. In the present example, the sub-CPU 203 recognizes the storage device 113a as an HDD, and the storage device 113b as an SSD. By recognizing the type of each storage device in advance, the sub-CPU 203 performs power saving control corresponding to the recognized type for a respective storage device. In addition, with respect to a storage device that is not an access destination for the main CPU 104, the sub-CPU 203 performs power saving control corresponding to the type of the storage device even if the DEVSLP signal 209 is in the OFF state.

In the present embodiment, power saving control for an HDD is realized by causing the state of the HDD to shift to the power OFF state by using the corresponding switch control signal 213a. In addition, power saving control for an SSD is realized by causing the SSD to shift to the DEVSLP state by using the corresponding DEVSLP signal 211b, instead of having the SSD shift to the power OFF state. As described above, the DEVSLP state is a low power consumption state that corresponds to a state where power is not supplied to portions in the storage device 113b (an SSD) other than the power source controller 215.

Upon shifting to a power saving state (the DEVSLP state) by the DEVSLP signal 211b being asserted, power consumption by the SSD can be reduced to substantially 0W (approximately 2 mW, for example). For this reason, in the present embodiment, for an SSD, illustration is given for an example in which power saving control is performed by causing a shift to the DEVSLP state while keeping the SSD in a power ON state. This can be realized by controlling a signal level of the DEVSLP signal 211b while keeping the switch control signal 213b that corresponds to an SSD (the storage device 113b) in the ON state, as with the waveforms 403 and 404 of FIG. 4. Note that, because the SSD can return to the normal power state from the power OFF state in a short amount of time of 10 ms, the power saving control may be performed by using the power OFF state as the power saving state instead of the DEVSLP state. In such a case, ON/OFF control of the supply of power to the storage device 113b (an SSD) is performed by using the switch control signal 213b.

(HDD Power Saving Control and Power Consumption)

In the example of FIG. 4, the sub-CPU 203 recognizes that an access request to the HDD occurred in accordance with processing for determining the access destination (step S604 of FIG. 6) at T0 when the DEVSLP signal 209 is negated. As a result, the sub-CPU 203 sets the switch control signal 213a which is for the HDD to the ON state. By this, the power consumption of the HDD in the time period from T0 until T3 when the DEVSLP signal 209 is asserted changes similarly to the comparative example (the waveform 304), as the waveform 405.

Subsequently, the sub-CPU 203 recognizes that an access request to the SSD occurred in accordance with processing for determining the access destination (step S604 of FIG. 6) at T4 when the DEVSLP signal 209 is negated again. In this case, the sub-CPU 203 sets the switch control signal 213a which is for the HDD to the OFF state. By this, after T3 where an access request to the HDD does not occur, the power consumption of the HDD is kept at zero, as in the waveform 405.

In this way, in the present embodiment the HDD is kept in the power OFF state without depending on the DEVSLP signal 209, whereas in the comparative example spinning up of the HDD is performed in accordance with the negation of the DEVSLP signal 209 at T4. Accordingly, it is possible to prevent power being wastefully consumed in the HDD in the time period from T4 until T7 when the DEVSLP signal 209 is asserted, as supply of power to the HDD due to an access request to the SSD does not occur. Comparing the waveform 405 with the waveform 304 of FIG. 3, it is possible to reduce power consumption by the HDD in the time period from T4 to T7 in the present embodiment.

(SSD Power Saving Control and Power Consumption)

Subsequently, the sub-CPU 203 recognizes that an access request to the SSD occurred in accordance with processing for determining the access destination (step S604 of FIG. 6) at T4 when the DEVSLP signal 209 is negated again. As a result, as with the waveform 404, by negating the DEVSLP signal 211b for the SSD to have the DEVSLP signal 211b enter the OFF state, the sub-CPU 203 causes the SSD to return from the power saving state (the DEVSLP state) to the normal power state. By this, as with the waveform 406, the power consumption of the SSD changes at T4 from power consumption P6 in the DEVSLP state (lower than P4 of FIG. 3 and substantially 0 W) to power consumption P5, and remains at P5 while read/write access is performed.

Subsequently, as in the waveform 404, the sub-CPU 203 has the DEVSLP signal 211b enter the ON state by asserting it at T6 when access to the SSD ends to thereby cause the SSD to shift to the power saving state again. By this, the power consumption of the SSD decreases from P5 to P6 as in the waveform 406. In this way, the sub-CPU 203 controls the DEVSLP signal 211b to cause the SSD to return from the power saving state for only a time period for performing access with respect to the SSD (the time period from T4 to T6) regardless of control of the DEVSLP signal 209 by the main CPU 104. Accordingly, it is possible to prevent power from being wastefully consumed in the SSD during the time period in which access to the SSD is not performed. Comparing the waveform 406 with the waveform 305 of FIG. 3, it is possible to reduce power consumption by the SSD in the time period from T0 to T3 and the time period from T6 to T7, in the present embodiment.

<Initialization Processing by Sub-CPU>

Figure 5:
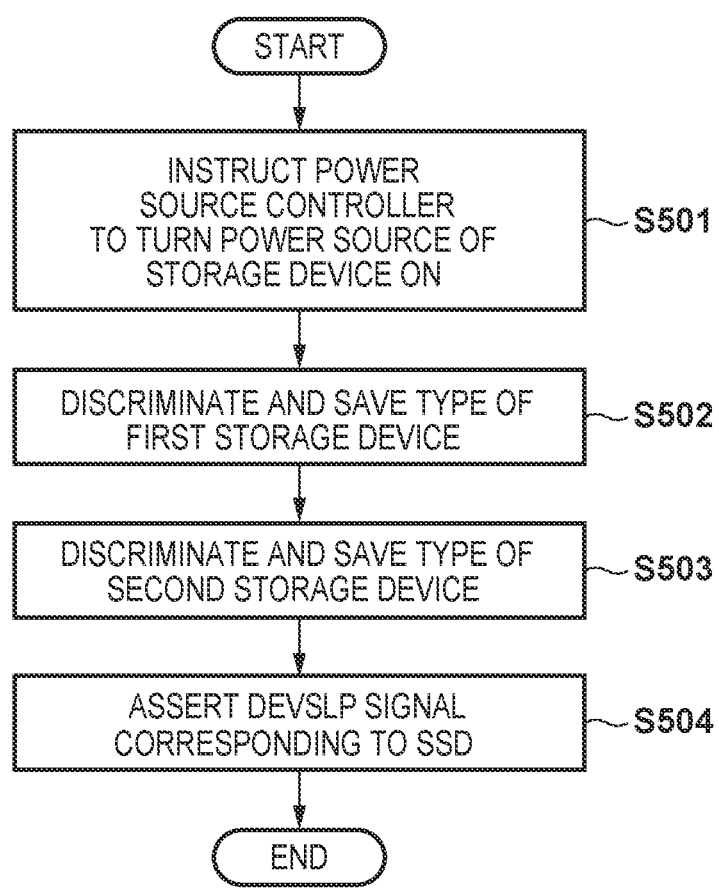
FIG. 5 is a flowchart illustrating a procedure of initialization processing relating to power saving control, according to the first embodiment.

FIG. 5 is a flowchart that illustrates a procedure for initialization processing executed by the sub-CPU 203, according to the present embodiment. The processing of each step of FIG. 5 is realized in the MFF 101 by the sub-CPU 203 reading a program stored in the flash ROM 206 or the memory 205 and executing the program. In the present embodiment, the sub-CPU 20.3 executes initialization processing by the procedure of FIG. 5 when the MFP 101 is activated from a power OFF state.

In step S501, upon starting the initialization processing, the sub-CPU 203 sets the switches 117a and 117b to the ON state in order to recognize the type of the storage devices connected to the SATA bridge 112 (the storage devices 113a and 113b in the present embodiment). Specifically, via the GPIO 204, the sub-CPU 203 instructs the power source controller 114 to set the switch control signals 213a and 213b to the ON state. By the switch control signals 213a and 213b entering the ON state, power is supplied to the storage devices 113a and 113b from the power source unit 118.

Next, in step S502 and in step S503, the sub-CPU 203 identifies whether each of the storage devices 113a and 113b (a plurality of storage devices) is an HDD (a non-volatile storage device that uses a magnetic head) or an SSD (a non-volatile storage device that uses a flash memory). Specifically, in step S502, the sub-CPU 203 accesses the storage device 113a via the SATA host I/F 202a, discriminates the type of the storage device (in other words, whether the storage device is an HDD or an SSD), and saves the discrimination result in the memory 205. Furthermore, in step S503, the sub-CPU 203 accesses the storage device 113b via the SATA host I/F 202b, similarly discriminates the type of the storage device, and saves the discrimination result in the memory 205. By this, the sub-CPU 203 can recognize the types (HDD or SSD) of the storage devices 113a and 113b, based on the information stored in the memory 205.

The sub-CPU 203, for example, obtains device information of the storage device 113a via the SATA host I/F 202a, and discriminates the type of the storage device based on the device information. The device information is a model name or information on a number of rotations of the storage device, for example. If the information on the number of rotations indicates a predetermined number of rotations (7200 rpm, 5400 rpm, or the like), it is possible to discriminate that the storage device is an HDD, and if the information on the number of rotations indicates media that does not rotate, it is possible to discriminate that the storage device is an SSD. Alternatively, the type of the storage device may be discriminated by matching the model name indicated by the device information with a list that is stored in advance in the memory 205 or the flash ROM 206.

Finally, in step S504, the sub-CPU 203 asserts a DEVSLP signal (the DEVSLP signal 211b corresponding to the storage device 113b in the present embodiment) for the storage device discriminated as an SSD out of the storage devices connected to the SATA bridge 112. In other words, the sub-CPU 203 causes the storage device 113b (SSD) to shift to a power saving state (the DEVSLP state) by causing the SATA host I/F 202b to switch the DEVSLP signal 211b from the OFF state to the ON state. The sub-CPU 203 thus ends the initialization processing.

<Power Saving Control by Sub-CPU>

Figure 6:
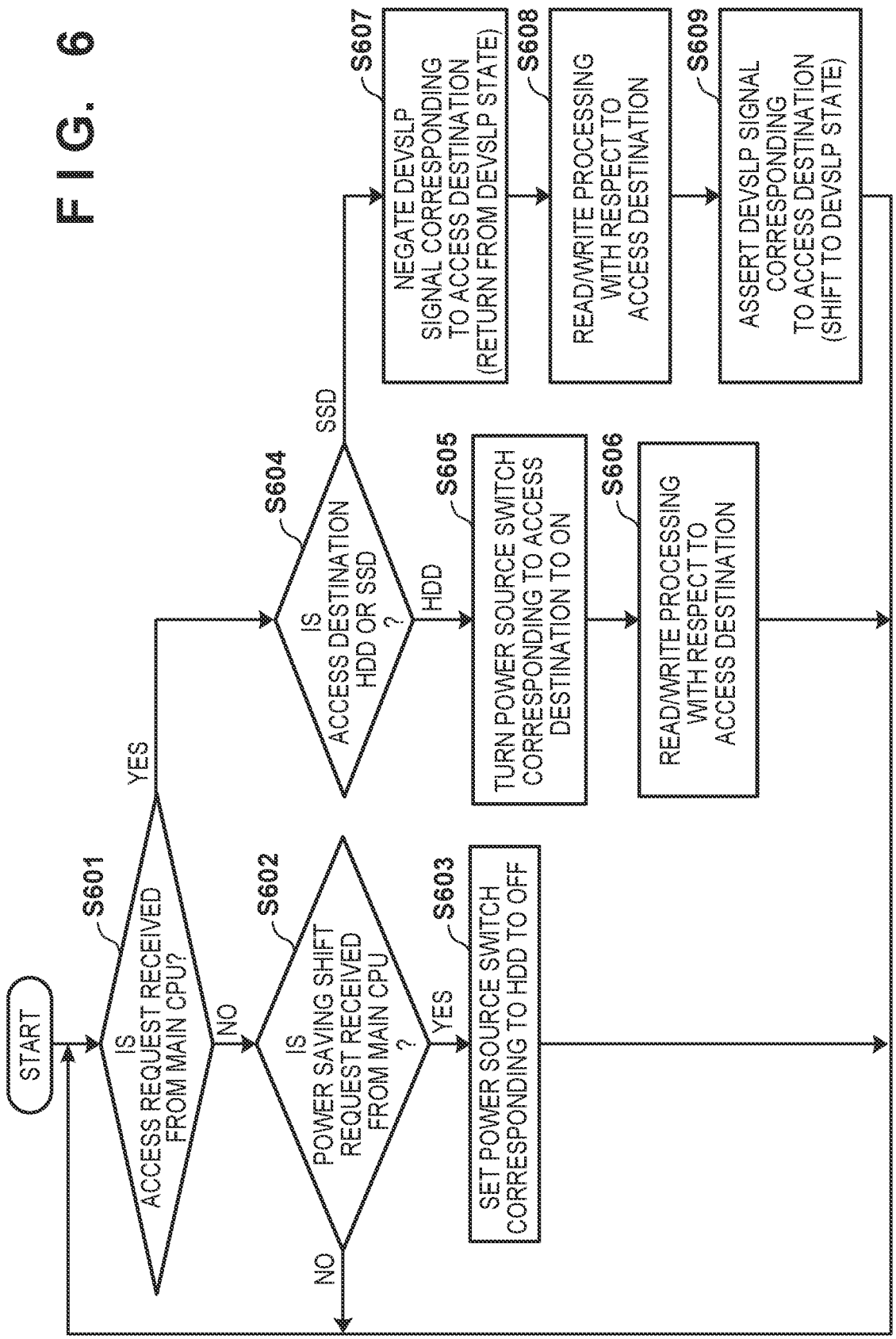
FIG. 6 is a flowchart illustrating a processing procedure for power saving control, according to the first embodiment.

FIG. 6 is a flowchart that illustrates a processing procedure for power saving control of a storage device that is executed by the sub-CPU 203, according to the present embodiment. The processing of each step of FIG. 6 is realized in the NFP 101 by the sub-CPU 203 reading a program stored in the flash ROM 206 or the memory 205 and executing the program. In the present embodiment, the sub-CPU 203 executes processing for power saving control by the procedure of FIG. 6 when the initialization processing of FIG. 5 ends.

In step S601, the sub-CPU 203 determines whether it has received from the main CPU 104 an access request (read/write access request) with respect to a storage device, and advances the processing to step S602 if an access request has not been received, and advances the processing to step S604 if an access request has been received.

In step S602, the sub-CPU 203 determines whether it has received from the main CPU 104 a power saving shift request indicating causing a storage device to shift to a power saving state. As described above, the main CPU 104 instructs a shift to a power saving state by asserting the DEVSLP signal 209 (switching it from the OFF state to the ON state). For this reason, the sub-CPU 203 determines that it has received a power saving shift request if the DEVSLP signal 209 changes from the OFF state to the ON state. The sub-CPU 203 returns the processing to step S601 if it has not received a power saving shift request, and advances the processing to step S603 if it has received a power saving shift request.

In step S603, the sub-CPU 203 sets a power source switch corresponding to an HDD (the switch 117a corresponding to the storage device 113a in the present embodiment) to the OFF state. Specifically, via the GPIO 204, the sub-CPU 203 instructs the power source controller 114 to set the switch control signal 213a to the OFF state. When the switch control signal 213a enters the OFF state, the switch 117a enters the OFF state, and supply of power from the power source unit 118 to the storage device 113a stops. As a result, the storage device 113a shifts to a power saving state (the power OFF state). Subsequently, the sub-CPU 203 returns the processing to step S601.

Meanwhile, upon advancing the processing to step S604 after receiving an access request, the sub-CPU 203 determines whether an access destination is an HDD or an SSD by executing a determination process for determining the storage device that is the access destination, based on the received access request. In the determination process, the access destination is determined from type information of the storage device that is stored in the memory 205, and details of the access indicated by the access request.

Upon determining in step S604 that the access destination is an HDD, the sub-CPU 203 advances the processing to step S605. In step S605, the sub-CPU 203 sets a power source switch corresponding to an HDD (the switch 117a corresponding to the storage device 113a in the present embodiment) which is the access destination to the ON state. This is performed by making an instruction, via the GPIO 204, to the power source controller 114 for the switch control signal 213a to enter the OFF state. When the switch control signal 213a enters the ON state, the switch 117a enters the ON state, and supply of power from the power source unit 118 to the storage device 113a starts. As a result, the storage device 113a returns from the power saving state.

When the storage device 113a which is the access destination returns from the power saving state, in step S606, the sub-CPU 203 performs, via the SATA host I/F 202a, read/write processing based on the access request with respect to the storage device 113a which is the access destination, and then returns the processing to step S601.

In this way, in a case where a control target storage device is the storage device 113a (HDD), the sub-CPU 203 causes the GPIO 204 (the power source controller 114) to have the storage device 113a return from the power saving state (step S605) when an access request arises. Note that, when an access request arises, the main CPU 104 negates the DEVSLP signal 209. Accordingly, the sub-CPU 203 may cause the storage device 113a to return from the power saving state in accordance with an instruction for return from the power saving state that is based on the DEVSLP signal 209. In addition, upon receiving an instruction for shifting to a power saving state from the main CPU 104 based on the DEVSLP signal 209, the sub-CPU 203 causes the GPIO 204 (the power source controller 114) to have the storage device 113a shift to the power saving state (step S602).

Meanwhile, upon determining in step S604 that the access destination is an SSD, the sub-CPU 203 advances the processing to step S607. In step S607, the sub-CPU 203, by negating the DEVSLP signal (the DEVSLP signal 211b corresponding to the storage device 113b in the present embodiment) corresponding to the storage device that is the access destination, causes the storage device to return from the power saving state (the DEVSLP state). In other words, the sub-CPU 203 causes the storage device 113b (SSD) to return from a power saving state (the DEVSLP state) by causing the SATA host I/F 202b to switch the DEVSLP signal 211b from the ON state to the OFF state.

When the storage device 113b which is the access destination returns from the power saving state, in step S608, the sub-CPU 203 performs, via the SATA host I/F 202b, read/write processing based on the access request with respect to the storage device 113b which is the access destination, and then advances the processing to step S609. In step S609, the sub-CPU 203, by asserting (switching from the OFF state to the ON state) the DEVSLP signal 211b that corresponds to the storage device 113b which is the access destination, causes the storage device to shift to the power saving state (the DEVSLP state) again, and then returns the processing to step S601.

In this way, in a case where a control target storage device is the storage device 113b (SSD), the sub-CPU 203 causes the SATA host I/F 202b to have the storage device 113b return from the power saving state (step S607) when an access request arises. In addition, when processing based on the access request (step S608) completes, the sub-CPU 203 causes the SATA host I/F 202b to have the storage device 113b shift to the power saving state (step S609).

As explained above, in the present embodiment, the sub-CPU 203 of the storage system 119 discriminates (identifies) in advance whether a storage device connected to the SATA bridge 112 is an HDD (a first type) or an SSD (a second type). The sub-CPU 203, upon receiving a control signal relating to predetermined power saving control from the main CPU 104 (a control circuit), performs power saving control of the storage devices 113a and 113b in accordance with a result of identifying the type of the storage device. In particular, upon receiving from the main CPU 104, which is outside of the storage system 119, an instructing for shifting to power saving that does not distinguish the type of the storage device, the sub-CPU 203 instructs a power control unit corresponding to the discriminated type to perform power control for causing the storage device to shift to the power saving state.

Specifically, if the discriminated type is HDD, the sub-CPU 203 causes the GPIO 204 (the power source controller 114) to shift the storage device into a power saving state in accordance with the received shift instruction. In addition, if the discriminated type is SSD, the sub-CPU 203 causes the SATA host I/Fs 202a and 202b to shift the storage device to a power saving state in accordance with whether or not there is an access request to the storage device from the main CPU 104.

In addition, if a plurality of storage devices (the storage devices 113a and 113b) are provided in the storage system 119, the sub-CPU 203 discriminates the type of each of the plurality of storage devices as in the embodiment described above. Furthermore, for each storage device, the sub-CPU 203 instructs the power control unit (the GPIO 204 (the power source controller 114) or a SATA host I/F 202) corresponding to the discriminated type to perform power control for causing the storage device to shift to a power saving state.

By such power saving control, it is possible to perform power saving control suitable to the type of a storage device provided in the storage system 119. As a result, it is possible to increase a power saving effect in accordance with power saving control of the storage device.

In addition, in the foregoing embodiment, the sub-CPU 203 determines a storage device out of the storage devices 113a and 113b that is to be an access destination upon receiving an access request to a storage device from the main CPU 104. Furthermore, the sub-CPU 203 maintains a power saving state for a storage device that is not the access destination. By this, in a storage device that is not the access destination, it is possible to reduce power consumption and it is possible to prevent wasteful power consumption occurring.

Note that, in the foregoing embodiment, the amount of time Ta is measured from a timing when the DEVSLP signal 209 is negated, but the amount of time Ta may be measured from a timing when access to an HDD (the storage device 113a) completes.

Second Embodiment

In the first embodiment, when read/write processing with respect to an SSD (the storage device 113b) that is in accordance with an access request to the SSD completes (step S608), the DEVSLP signal 211b is promptly asserted and the SSD is caused to shift to a power saving state (the DEVSLP state). In contrast to this, in the second embodiment, explanation is given for an example in which the DEVSLP signal 211b is not promptly asserted, but the timer 207 in the SATA bridge 112 is used to delay a timing when the DEVSLP signal 211b is asserted by a certain amount of time. Note that, in the present embodiment, for simplicity of the explanation, explanation is given mainly for portions different to that of the first embodiment.

A reason for delaying the timing for asserting the DEVSLP signal 211b is in order to prevent a decrease in performance of access with respect to the SSD that is due to the return interval of approximately 10 ms required for the SSD to return from the DEVSLP state. In many cases, the SSD consecutively receives read/write access across a certain amount of time. However, each time one access to the SSD occurs, processing waits for a return interval (approximately 10 ms) for each access if the SSD repeatedly returns from and shifts to the DEVSLP state. This leads to a decrease of performance with respect to the SSD.

Accordingly, in the present embodiment, the sub-CPU 203 keeps the SSD in an idle state for a predetermined amount of time Tb from when access to the SSD completes, and causes the SSD to shift to the DEVSLP state after confirming that consecutive access has not occurred. However, an amount of time Tb for inhibiting a shift of the SSD to the DEVSLP state may be much shorter than the amount of time Ta (ten minutes) for HDD protection, and may be around ten seconds to one minute, for example. In other words, Tb may be smaller than the amount of time Ta which is predetermined as an amount of time for causing a storage device of the first type (an HDD) to shift to a power saving state when an access request with respect to the storage device has not occurred. Note that measurement of the amount of time Tb may be performed by the sub-CPU 203 using the timer 207. A number of the timer 207 needs to be the same as the number of SSDs connected to the SATA bridge 112, and there is one timer 207 in the present embodiment.

<Storage System Power Saving Control and Power Consumption>

Figure 7:
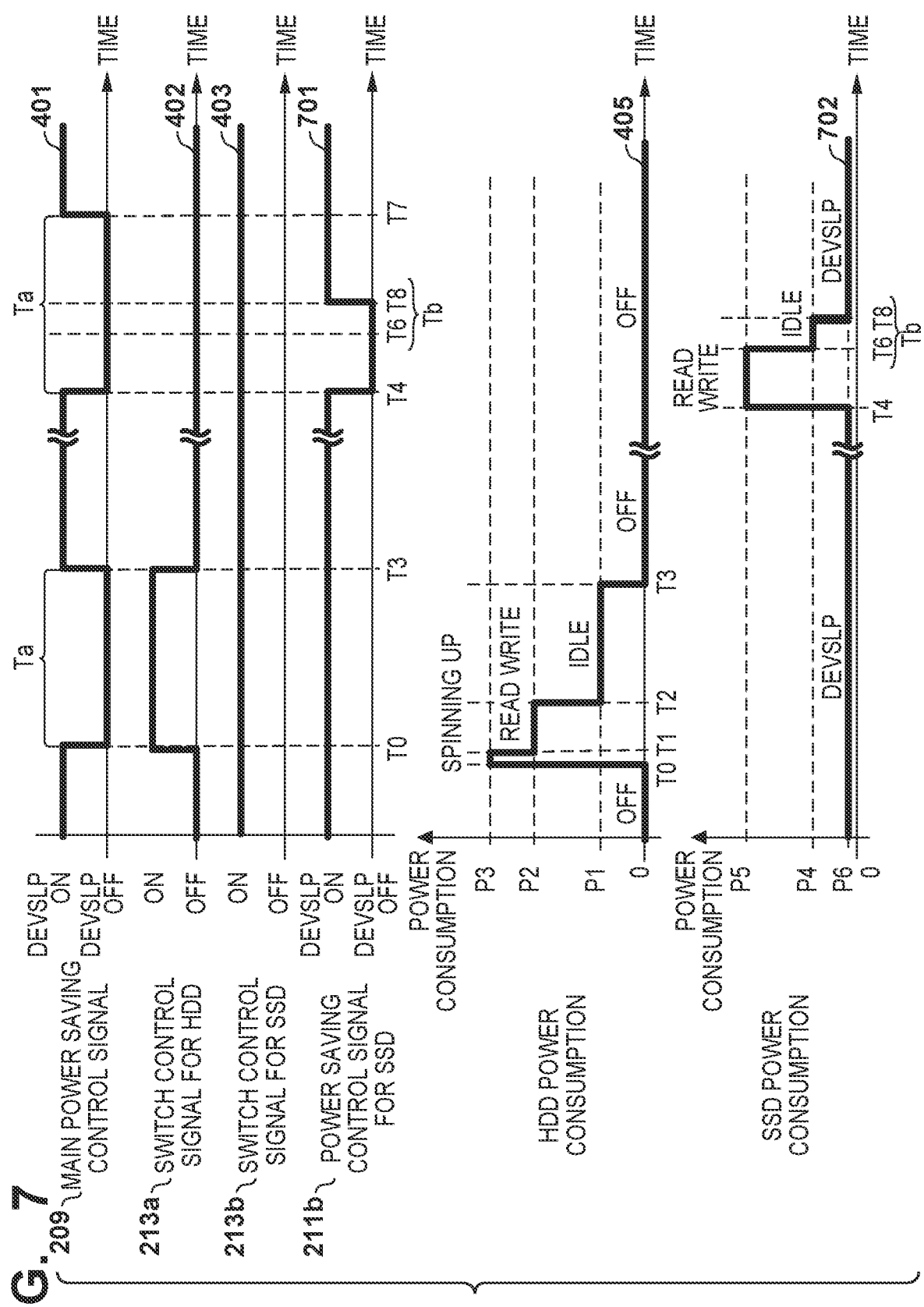
FIG. 7 illustrates an example transition of power consumption of a storage device and control signals in power saving control according to a second embodiment.

FIG. 7 illustrates an example transition of power consumption of the storage devices 113a and 113b, and control signals for the power saving control in the MFF 101 according to the present embodiment. Note that, similarly to in the first embodiment, illustration is given of an example in which the storage device 113a is an HDD and the storage device 113b is an SSD. Differences between FIG. 7 and FIG. 4 which was explained in the first embodiment are a waveform 701 of the DEVSLP signal 211b which corresponds to the storage device 113b (SSD) and a waveform 702 that represents temporal change for power consumption of the storage device 113b (SSD).

In the present embodiment, the sub-CPU 203 clears the timer 207 and causes it to start a count at a time T6 when access to the SSD ends, without promptly asserting the DEVSLP signal 211b as in the first embodiment (the waveform 404 of FIG. 4). By this, the sub-CPU 203 uses the timer 207 to measure the amount of time Tb until it causes the SSD to shift to a power saving state.

Subsequently, at a time T8 when the count value of the timer 207 reaches a predetermined value that corresponds to the amount of time Tb, the sub-CPU 203 asserts the DEVSLP signal 211b to thereby cause the SSD to shift to the power saving state. If access to the SSD occurs again before T8, the sub-CPU 203 causes the count by the timer 207 to stop, and when the access ends, clears the timer 207 and causes the count to start again. In this way, the sub-CPU 203 causes the SSD to shift to the power saving state when an idle state of the SSD continues throughout the amount of time Tb without access to the SSD occurring.

In the foregoing power saving control, the SSD is kept in the idle state in the time period from T6 to T8. For this reason, power consumption by the SSD differs from that in the first embodiment (the waveform 406 of FIG. 4) and power consumption P4 for the idle state occurs in the time period from T6 to T8.

<Initialization Processing by Sub-CPU 203>

Figure 8:
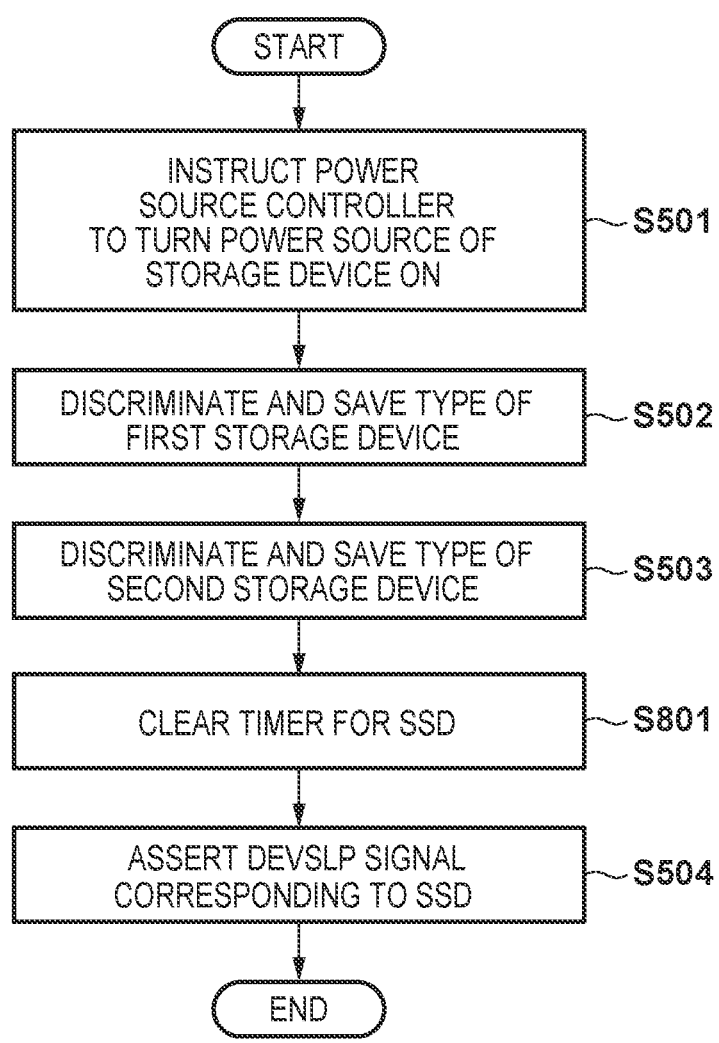
FIG. 8 is a flowchart illustrating a procedure of initialization processing relating to power saving control, according to the second embodiment.

FIG. 8 is a flowchart that illustrates a procedure for initialization processing executed by the sub-CPU 203, according to the present embodiment. The processing of each step of FIG. 8 is realized in the MFP 101 by the sub-CPU 203 reading a program stored in the flash ROM 206 or the memory 205 and executing the program.

In the initialization processing of the present embodiment, after discrimination and saving of the type of the storage device 113b in step S503, the sub-CPU 203, in step S801, clears (initializes) the timer 207 used for measurement of the amount of time Tb. Subsequently, in step S504, the sub-CPU 203 asserts the DEVSLP signal corresponding to the SSD, and the processing ends. Note that the timer 207 does not start a count in step S801 because counting starts when access to the SSD ends.

<Power Saving Control by Sub-CPU 203>

Figure 9:
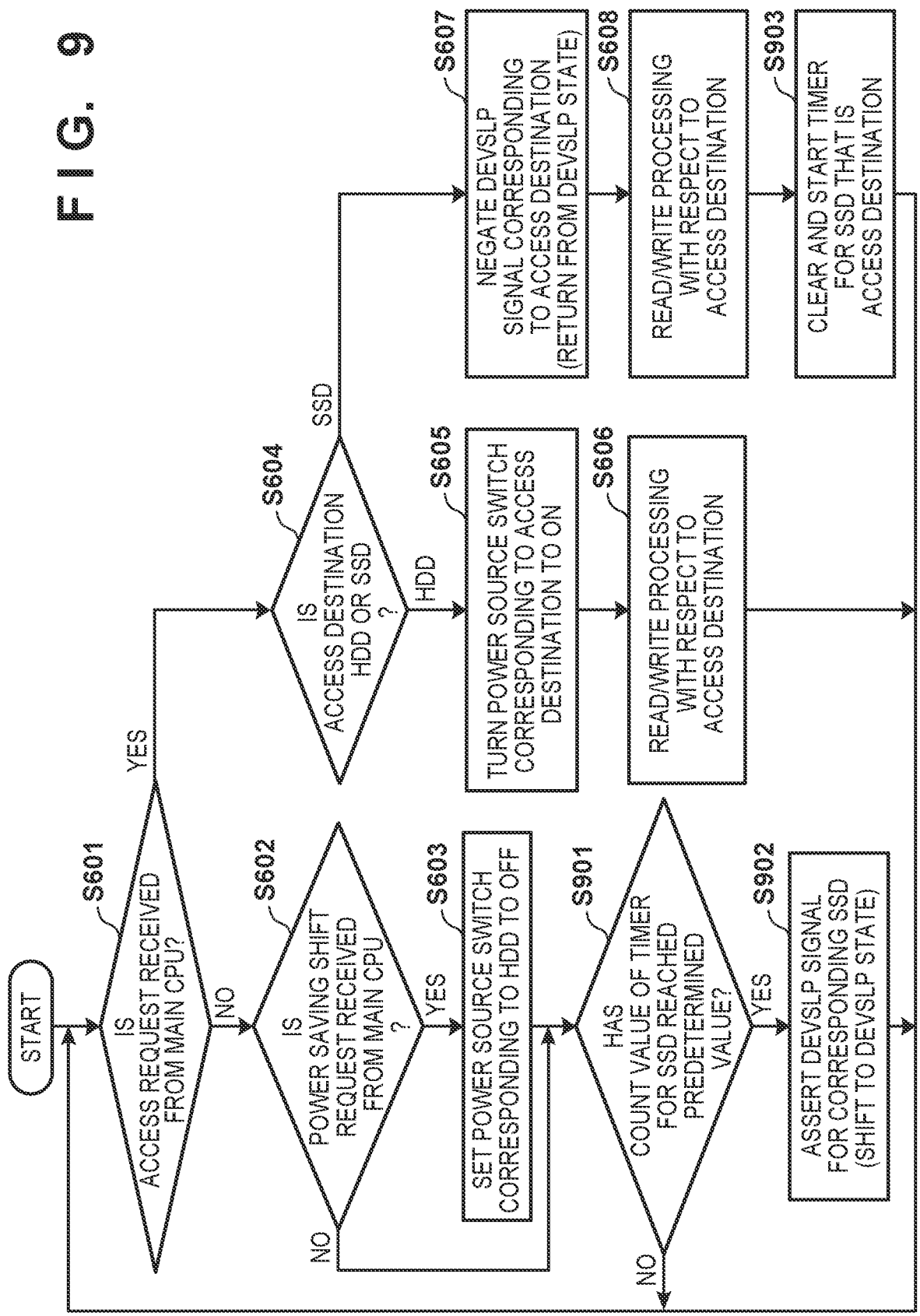
FIG. 9 is a flowchart illustrating a processing procedure for power saving control of a storage device, according to the second embodiment.

FIG. 9 is a flowchart that illustrates a processing procedure for power saving control of a storage device that is executed by the sub-CPU 203, according to the present embodiment. The processing of each step of FIG. 9 is realized in the NFP 101 by the sub-CPU 203 reading a program stored in the flash ROM 206 or the memory 205 and executing the program.

In the power saving control of the present embodiment, after the processing of step S602 or step S603 and regardless of whether there is a power saving shift request from the main CPU 104, the sub-CPU 203, in step S901, determines whether the count value of the timer 207 has reached the predetermined value corresponding to the amount of time Tb. The sub-CPU 203 returns the processing to step S601 if the count value has not reached the predetermined value, and advances the processing to step S902 if the count value has reached the predetermined value. In step S902, the sub-CPU 203 asserts the DEVSLP signal 211b for the SSD corresponding to the timer 207 for which the count value reached the predetermined value to thereby cause this SSD to shift to a power saving state, and then returns the processing to step S601.

In addition, in the power saving control of the present embodiment, the sub-CPU 203, when read/write processing in step S608 with respect to the SSD (the storage device 113b) that is based on an access request completes, advances the processing to step S903. In step S903, the sub-CPU 203, instead of asserting the DEVSLP signal 211b as in the first embodiment (step S609), clears the timer 207 and causes the timer 207 to start a count. Subsequently, the sub-CPU 203 returns the processing to step S601. By such processing, it is possible to control the DEVSLP signal 211b as with the waveform 701 of FIG. 7.

In this way, in the present embodiment, if a storage device that is a control target is the storage device 113b (an SSD), the sub-CPU 203 has the SATA host I/F 202b cause the storage device 113b to return from the power saving state (step S607) when an access request occurs. In addition, when, after processing based on the access request completes (step S608), the amount of time Tb elapses without a new access request occurring ("YES" in step S901), the sub-CPU 203 has the SATA host I/F 202b cause the storage device 113b to shift to the power saving state (step S902), By this, in addition to the effects in the first embodiment, it is possible to prevent performance of access with respect to an SSD decreasing due to a return interval required for the SSD to return from a power saving state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-011391, filed Jan. 25, 2017, which is hereby incorporated by reference herein in its entirety.

What is claimed is:

1. A system comprising an information processing apparatus to which a non-volatile semiconductor storage device and a non-volatile magnetic storage device are connected, the information processing apparatus comprising:
   first controller circuitry that transmits an access request;
   second controller circuitry that transmits, to the non-volatile semiconductor storage device, a control signal; and
   a power source controller that shifts a power state of the non-volatile magnetic storage device to a normal power state or to a power saving state,
   wherein the power source controller causes power to be supplied to the non-volatile magnetic storage device in the normal power state and causes power not to be supplied to the non-volatile magnetic storage device in the power saving state,
   wherein the non-volatile semiconductor storage device receives the control signal from the second controller circuitry and shifts a power state of the non-volatile semiconductor storage device to the normal power state or to the power saving state in which less power is consumed than in the normal power state, and
   wherein in a case where the second controller circuitry receives the access request from the first controller circuitry in a state where the non-volatile magnetic storage device and the non-volatile semiconductor storage device are in the power saving state:
   (i) based on the received access request being a request to access the non-volatile semiconductor storage device, (a) the second controller circuitry outputs the control signal as a return control signal, and (b) the non-volatile semiconductor storage device receives the return control signal and returns from the power saving state to the normal power state based on the received return control signal, and
   (ii} based on the received access request being a request to access the non-volatile magnetic storage device, the power source controller causes a supply of power to the non-volatile magnetic storage device to be started.

2. The system according to claim 1, wherein
   the second controller circuitry outputs the control signal and the non-volatile semiconductor storage device receives the control signal and shifts to the power saving state in accordance with a completion of processing based on the request to access the non-volatile semiconductor storage device.

3. The system according to claim 1, wherein
   the power source controller is caused to stop the supply of power to the non-volatile magnetic storage device in accordance with an elapse of a predetermined amount of time without an additional access request to the non-volatile magnetic storage device after processing based on a previous access request to the non-volatile magnetic storage device is completed.

4. The system according to claim 3, wherein the predetermined amount of time is smaller than a second predetermined amount of time for the non-volatile semiconductor storage device to shift to the power saving state when no access request to the non-volatile semiconductor storage device has occurred.

5. The system according to claim 1, wherein
the power source controller causes the non-volatile magnetic storage device to shift to the power saving state by controlling a switch for stopping the supply of power to the non-volatile magnetic storage device from a power source, and
the second controller circuitry outputs the control signal to and the non-volatile semiconductor storage device receives the control signal and shifts to the power saving state by stopping a supply of power to some, but not all, devices in the non-volatile semiconductor storage device.

6. The system according to claim 2, wherein
the second controller circuitry causes the non-volatile semiconductor storage device to shift to the power saving state by asserting a DEVSLP signal, and causes the non-volatile semiconductor storage device to return from the power saving state by negating the DEVSLP signal.

7. The system according to claim 1, further comprising: a control circuit for making an instruction relating to power saving control of a storage device that a storage system comprises, and transmitting to the storage system an access request with respect to the storage device.

8. A method of controlling an information processing apparatus to which a non-volatile semiconductor storage device and a non-volatile magnetic storage device are connected, the information processing apparatus comprising: first controller circuitry that transmits an access request, second controller circuitry that transmits, to the non-volatile semiconductor storage device, a control signal and a power source controller that shifts a power state of the non-volatile magnetic storage device to a normal power state or to a power saving state, the method comprising:
causing, by the power source controller, power to be supplied to the non-volatile magnetic storage device in the normal power state and causing power not to be supplied to the non-volatile magnetic storage device in the power saving state;
receiving, by the non-volatile semiconductor storage device, the control signal from the second controller circuitry and shifting a power state of the non-volatile semiconductor storage device to the normal power state or to the power saving state in which less power is consumed than in the normal power state; and
in a case where the second controller circuitry receives the access request from the first controller circuitry in a state where the non-volatile magnetic storage device and the non-volatile semiconductor storage device are in the power saving state:
(i) based on the received access request being a request to access the non-volatile semiconductor storage device, (a) outputting the control signal as a return control signal, by the second controller circuitry, and (b) receiving, by the non-volatile semiconductor storage device, the return control signal and returning from the power saving state to the normal power state based on the received return control signal, and
(ii) based on the received access request being a request to access the non-volatile magnetic storage device, causing, by the power source controller, a supply of power to the non-volatile magnetic storage device to be started.

9. A computer-readable storage medium storing a program for causing execution of a method of controlling an information processing apparatus to which a non-volatile semiconductor storage device and a non-volatile magnetic storage device are connected, the information processing apparatus comprising: first controller circuitry that transmits an access request, second controller circuitry that transmits, to the non-volatile semiconductor storage device, a control signal and a power source controller that shifts a power state of the non-volatile magnetic storage device to a normal power state or to a power saving state, the method comprising:
causing, by the power source controller, power to be supplied to the non-volatile magnetic storage device in the normal power state and causing power not to be supplied to the non-volatile magnetic storage device in the power saving state;
receiving, by the non-volatile semiconductor storage device, the control signal from the second controller circuitry and shifting a power state of the non-volatile semiconductor storage device to the normal power state or to the power saving state in which less power is consumed than in the normal power state; and
in a case where the second controller circuitry receives the access request from the first controller circuitry in a state where the non-volatile magnetic storage device and the non-volatile semiconductor storage device are in the power saving state:
(i} based on the received access request being a request to access the non-volatile semiconductor storage device, (a) outputting the control signal as a return control signal, by the second controller circuitry, and (b) receiving, by the non-volatile semiconductor storage device, the return control signal and returning from the power saving state to the normal power state based on the received return control signal, and
(ii) based on the received access request being a request to access the non-volatile magnetic storage device, causing, by the power source controller, a supply of power to the non-volatile magnetic storage device to be started.

10. The system according to claim 1, further comprising:
a first switch that controls the supply of power from a power source to the non-volatile magnetic storage device; and
a second switch that controls a supply of power from the power source to the non-volatile semiconductor storage device,
wherein in a case where the non-volatile magnetic storage device and the non-volatile semiconductor storage device are shifted to the power saving state, the power source controller controls the first switch so as to stop the supply of power to the non-volatile magnetic storage device and controls the second switch so as to maintain the supply of power to the non-volatile semiconductor storage device.

* * * * *